Feb. 24, 1925.

G. H. HANDY

COTTON PICKER

Filed April 3, 1922    2 Sheets-Sheet 1

1,527,359

Inventor
George H. Handy,
By William L. Hall, Atty.

Feb. 24, 1925.

G. H. HANDY

COTTON PICKER

Filed April 3, 1922

1,527,359

Inventor
George H. Handy.
By William H. Hall, Atty.

Patented Feb. 24, 1925.

1,527,359

UNITED STATES PATENT OFFICE.

GEORGE H. HANDY, OF CHICAGO, ILLINOIS, ASSIGNOR, BY MESNE ASSIGNMENTS, TO STUKENBORG CORPORATION, OF WILMINGTON, DELAWARE, A CORPORATION OF DELAWARE.

COTTON PICKER.

Application filed April 3, 1922. Serial No. 549,322.

*To all whom it may concern:*

Be it known that I, GEORGE H. HANDY, a citizen of the United States, and a resident of Chicago, in the county of Cook and State of Illinois, have invented certain new and useful Improvements in Cotton Pickers; and I do hereby declare that the following is a full, clear, and exact description thereof, reference being had to the accompanying drawings, and to the characters of reference marked thereon, which form a part of this specification.

This invention relates to improvements in cotton pickers employing rotative brush elements to draw the cotton from the bur, and refers more particularly to improvements in guards which are arranged in front of the brushes to prevent extraneous substance, such as burs, parts of burs, twigs, and the like entering the head or casing in which the brushes are mounted.

An object of the invention is to provide an arrangement of guards to extend continuously across the front of the brushes, with the guards spaced to allow the seed cotton to be drawn readily into the head while rejecting extraneous substance and thus produce clean seed cotton.

A further object of the invention is to provide improved guards to extend continuously across or in front of the brushes, and so designed as to permit the cotton boll to be presented closely adjacent to the brushes at their forward, inwardly rotating sides, and thus give ample length of brush projection forwardly from the guards at the zone where the brushes bite the cotton from the bur.

Another object of the invention is to provide a form and arrangement of guards which will permit the suction tube through which the picked seed cotton is carried rearwardly to be decreased in diameter and thereby increase the flexibility of said tube and permit the head to be reduced and directed with greater facility to the cotton bolls.

A further object of the invention is to provide a novel means for supporting the guard structure to permit the guard structure as a whole to be readily moved away from the brushes to permit quick access to the brushes when desired.

Other objects of the invention are to improve and simplify cotton pickers and their guards, and the invention consists in the combination and arrangement of the elements shown in the drawings and described in the specification, and is pointed out in the appended claims.

In the drawings:

Figures 3 and 4 are views similar to Figure 2 showing modifications.

Figure 5 is a perspective view of a hinged anchor bar for the guards, showing the bearings therefor spaced from the hinge lugs or pintles.

Figure 1:
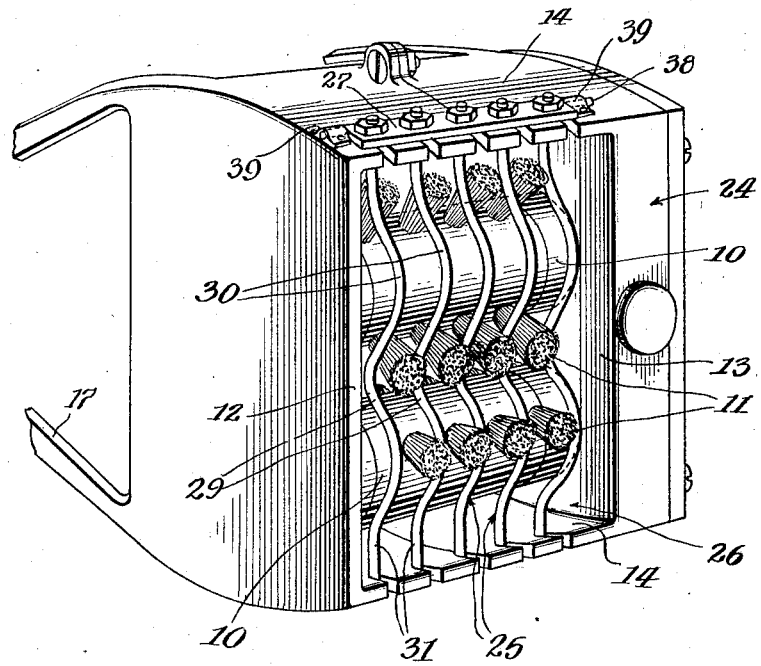
Figure 1 is a front perspective view of a picker head or casing, showing the application of my improved guards thereto and the relation of the guards to the brush elements.

The picker mechanism and its head shown is of the known Stukenborg type, embodying oppositely rotating and oppositely disposed coacting brushes 10, 10, having radial, peripheral brush media shown as having the form of angularly spaced rows of tufts 11. Said brushes are rotatively mounted in bearings (not necessary to be herein shown) supported in the side walls 12, 13 of the head. The head shown is principally of box-like formation comprising, in addition to the side walls 12, 13, top and bottom walls 14, 14. It is connected at its rear end to a take-off tube 15 that is joined at one end to an outlet or nozzle 16 of the head and is adapted for connection at its other end to a suitable exhaust device. In the present form of head the nozzle 16 is connected by skeleton members 17 to the box like portion of the head, thus providing ample air openings 18 to admit air to the head between the brushes and the nozzle. The cores 20 of the brushes are driven by a power shaft 21 which carries a worm 22 arranged between worm gears 23 fixed to the shafts of the brush cores exterior to the wall 13. A casing 24 having a removable cover encloses the driving gears.

25, 25 designate a plurality of guards which are arranged within the mouth 26 of the head and extend in front of the brushes 10 continuously from one wall 14 to the opposite wall. They may be fixed or anchored to said walls 14 of the casing in any suitable manner. As shown, the ends of the guards extend through forwardly opening slots in said walls 14, through apertures in anchor bars 27 and are terminally threaded to receive locking nuts 28.

Figure 2:
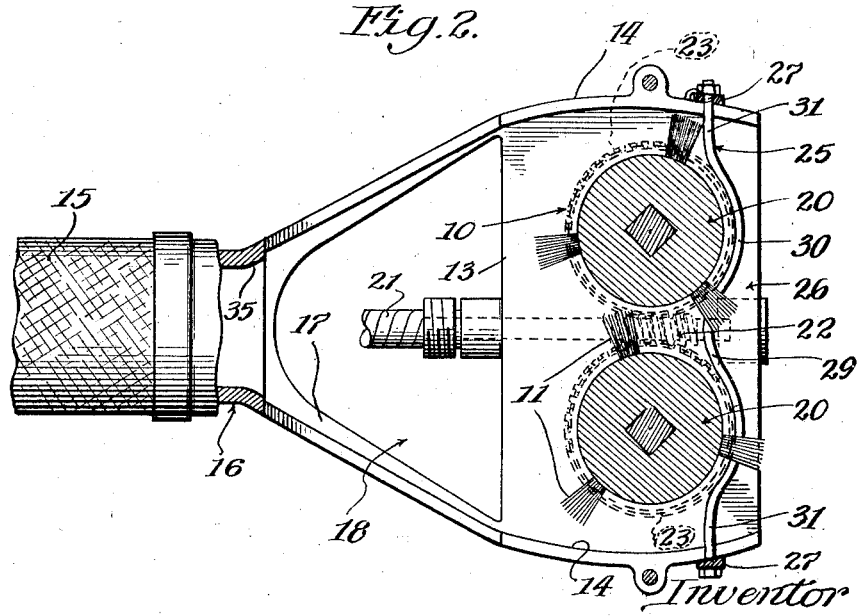
Figure 2 is a longitudinal sectional view of the head with parts shown in elevation.

The guards, shown in Figures 1, 2, and 3, are formed intermediate their ends with portions 29 which are curved towards the space between the brushes, which are disposed in front of the rearwardly moving, adjacent sides of the brushes, so that, viewing the guards as a series, they produce at the zone where the brush tufts 11 grasp the cotton, a skeleton, trough-like formation, as most clearly indicated in Figure 1. The purpose of this trough-like formation of the series of guards is to permit the tufts of the brushes to extend well forwardly of the guards at the zone where the coacting tufts operate to bite the cotton from the boll, so as to effect firm engagement of the cotton with the brush tufts to pull the cotton rearwardly between the brushes while, at the same time, preventing burs, parts of burs, twigs, and other objectionable material being drawn into the head. The said guards are spaced apart a sufficient distance to permit the seed cotton, containing cotton seed, to freely pass therebetween through the action of the brushes. The number of guards employed will depend upon the width of the head and the length of the brushes. While the brushes are shown as including spaced tufts, it will be understood that my improved guards may be employed with other forms of brushes. With the arrangement of the bristle tufts shown, it is practical to locate the guards between the tufts and this is a desirable arrangement because it lessens wearing contact between the tufts and guards and also brings the full pulling force of a tuft on the cotton to draw it into the head between the guards.

If desired, the guards provided with said intermediate, rearwardly curved portions, may be straight from the said intermediate curved portions 29 to the ends at which they are anchored to the casing, as shown in Figure 3. As shown in Figures 1 and 2, said guards are outwardly curved at 30 abreast the brush cores to conform to the core peripheries. Said curved portions 30 merge into straight portions 31 which extend through the walls 14 and are fastened thereto in the manner hereinbefore mentioned. An advantage of curving or bowing the guards abreast the brushes at 30 is that, inasmuch as the said bowed portions of the guards follow generally the curvature of the brush cores, longer lengths of the brush tufts will be projected forwardly from the guard outline for engagement with the cotton.

In Figure 4 is shown a form of guard 32 which is straight and extends continuously across the mouth in front of the brushes, and the series of guards may be anchored to the head in the same manner as in previously described figures. When using straight, continuous guards of the character shown in Figure 4 they may be made to approach at their intermediate portions the convex, forwardly facing brush formation produced at the front, rearwardly turning sides of two coacting brushes by providing the brush cores with annular recesses or grooves 33 in which the parts of the guards abreast said cores lie. This arrangement sets the central portions of the guards rearwardly beyond the forward peripheries of the brush cores and in such position relatively to the brush tufts as to cause the tufts to project forwardly from the guards a desired distance to grasp the cotton when the boll is presented thereto.

By the use of the guards described it will be apparent that burs, parts of burs, twigs, and like objectionable matter will be withheld from passing backwardly into the head, so as to produce a cleaner seed cotton back of the brushes and also reduce the work of cleaning the picked seed cotton. Furthermore, the use of said guards enables the general dimension of the head back of the brushes and at the nozzle to be materially reduced. The seed cotton back of the brushes will be free from such extraneous substance, and the general mass of the seed cotton passing through the head can be reduced. So also the take-off tube 15 can be reduced in diameter, and thus considerably increase the flexibility of the tube and the facility with which the head is presented to the cotton bolls. If desired, the nozzle 15 thus reduced, may be constructed with a flaring formation 35 to insure proper direction of the seed cotton into the tube.

As a further improvement, the said guards can be so mounted on the head and are so connected to each other that the guard structure as a whole may be swung away from one side of the head about a suitable hinge at the other side of the head and thus permit quick access to the brushes when required. The swinging mounting of the guard structure as a whole may be effected by providing the upper anchor bars 27 with endwise extending trunnions 38 which are mounted to rock in bearings 39 mounted on the upper wall of the picker head. When the guards are thus to be swung outwardly, the lower nuts 28 are released from the lower ends of the guards sufficiently to permit the lower anchor bar to clear the lower wall of the casing and thus allow the entire structure to be swung forwardly at its lower side about the axes of the trunnions 38.

The construction of picker mechanism shown is of that general type shown in the prior patent of Frederick W. Stukenborg, Number 1,402,724, issued January 3, 1922, wherein the picker brushes are rotated at a speed to generate centrifugal force to clear the cotton of the brushes without mechanical means for that purpose. It will be understood, however, that the invention is capable of adaptation to other specially different forms of picker mechanism.

I claim as my invention:

1. A cotton picker comprising a head having an intake mouth, coacting, rotative picker brushes thereat, and spaced guards extending, as integral members, continuously across the mouth in front of the brushes and anchored at their ends to opposite walls of the head.

2. A cotton picker comprising a head having an intake mouth, coacting, rotative picker brushes thereat, and spaced guards extending, as integral members, continuously across the mouth in front of the brushes and anchored at their ends to opposite walls of the head, and disposed transversely to the axes of rotation of said brushes.

3. A cotton picker comprising a head having an intake mouth, coacting, rotative picker brushes thereat, and spaced guards extending, as integral members, continuously across the mouth in front of the brushes and anchored at their ends to oposite walls of the head, and curved between their ends abreast, and towards the coacting, rearwardly turning parts of said brushes.

4. A cotton picker comprising a head having an intake mouth, coacting, rotative picker brushes thereat, and spaced guards within the casing mouth fixed to opposite walls of the head and extending, as integral members, continuously and transversely across the mouth in front of the brushes, said guards being curved between their ends, toward and abreast the coacting rearwardly turning parts of said brushes.

5. A cotton picker comprising a head provided with a cotton intake mouth, picker brushes thereat, rotative towards each other at their front sides and embracing cores and radially extending bristles, and guards continuously extending, as integral members, across the front sides of the brushes and anchored to opposite walls of the head, said guards being curved inwardly toward and abreast the space between the brush cores and reversely curved therebetween and their points of attachment to the casing to conform to the curvature of said brush cores.

6. A cotton picker comprising a hollow head having an intake mouth, cotton picker means thereat, and a guard structure extending across the picker means, embracing spaced guard elements, said guard structure having means to fasten it to two opposite walls of the head, the fastening means at one wall embracing a hinge.

7. A cotton picker comprising a hollow head having an intake mouth, cotton picker means thereat, and a guard structure extending across the picker means, embracing spaced guard elements, said guard structure having means to fasten it to two opposite walls of the head, the fastening means at one wall embracing a hinge, the guard fastening means at the other side of the head being adapted to release the guards to permit the guard structure to be swung outwardly from the cotton picker means about the axis of said hinge.

8. A cotton picker comprising a hollow head having an intake mouth, cotton picker means thereat, and a guard structure extending across the picker means, embracing spaced guard elements, which extend continuously from one wall of the head to the opposite wall, the said walls being provided with forwardly opening notches to receive the ends of the guard elements, anchor bars on said opposite walls of the head through which the ends of the guard members extend to constitute means to fix the guard members to said walls, one of said anchor members being hinged to its associated wall.

In witness whereof I claim the foregoing as my invention, I hereunto append my signature this 10 day of March, 1922.

GEORGE H. HANDY.